United States Patent [19]

Mirmiran et al.

[11] Patent Number: 5,599,599
[45] Date of Patent: Feb. 4, 1997

[54] FIBER REINFORCED PLASTIC ("FRP")-CONCRETE COMPOSITE STRUCTURAL MEMBERS

[75] Inventors: Amir Mirmiran, Orlando; Mohsen Shahawy, Tallahassee, both of Fla.

[73] Assignee: University of Central Florida, Orlando, Fla.

[21] Appl. No.: 499,050

[22] Filed: Jul. 6, 1995

[51] Int. Cl.⁶ .................................................. B29D 22/00
[52] U.S. Cl. .................. 428/36.3; 52/309.15; 52/309.16; 52/309.17; 52/DIG. 7; 428/120; 428/703; 428/902
[58] Field of Search .................... 428/36.3, 120, 428/188, 288, 320.2, 908.8, 34.5, 34.4, 34.6, 39.7, 703, 902, 294; 52/82, 309.15, 309.16, 307.17, 721, 722, 724, 725, DIG. 7

[56] References Cited

U.S. PATENT DOCUMENTS

| | | | |
|---|---|---|---|
| 3,520,749 | 7/1970 | Rubenstein | 156/173 |
| 3,644,611 | 2/1972 | Willes | 264/334 |
| 4,296,060 | 10/1981 | Killmeyer et al. | 264/137 |
| 4,821,804 | 4/1989 | Pierce | 166/367 |
| 5,028,368 | 7/1991 | Grau | 264/69 |
| 5,209,603 | 5/1993 | Morgan | 405/52 |
| 5,215,830 | 6/1993 | Cinti | 428/606 |
| 5,222,769 | 6/1993 | Kaempen | 285/45 |
| 5,242,721 | 9/1993 | Oonuki et al. | 428/34.5 |
| 5,320,452 | 6/1994 | Kunito | 405/233 |
| 5,339,475 | 8/1994 | Jaeger et al. | 14/73 |
| 5,359,873 | 11/1994 | Grondziel | 72/186 |
| 5,362,542 | 11/1994 | Ozawa et al. | 428/70 |
| 5,391,019 | 2/1995 | Morgan | 405/128 |

*Primary Examiner*—James J. Bell
*Attorney, Agent, or Firm*—Brian S. Steinberger; Law Offices of Brian S. Steinberger

[57] ABSTRACT

Fiber reinforced plastic FRP formed about concrete piles and columns. The FRP components generally includes an exterior shell and an interior pultruted component. The exterior shell can include multilayers of fibers wrapped in straight hoop patterns in single sheets with or without longitudinal axial fibers. Alternatively the exterior shell can include angled wrapped fibers. The interior FRP pultruted component comes in various forms such as pultruted ribs, crossed attached ribs, interior co-axial concentric cylinders and additional shapes such as ones having an H cross-shaped pattern. The FRP materials can consist of fiber and resin such as a preferred embodiment of approximately 60% glass and 40% polyester. Other fiber type materials include but are not limited to glass, carbon, Kevlar, combinations thereof, and the like. Types of resin include but are not limited to polyester, vinylester, epoxy, combinations thereof, and the like. The invention has the effect of waterproofing and insulating the exposed concrete columns and piles of infrastructure supports and protecting any steel/metal reinforcing bars and cages in the the cement cores from the effects of corrosion. The invention further increases the ductility of concrete support columns and piles without the use of additional steel reinforcing bars and cages. The invention can additionally enhance the compressive, flexural and shear strengths of concrete support columns and piles especially for infrastructures such as bridges, buildings and the like used in hurricane and seismic zone locations.

19 Claims, 4 Drawing Sheets

FIBER REINFORCED PLASTIC ("FRP")-CONCRETE COMPOSITE STRUCTURAL MEMBERS

This invention relates to structural support members, and in particular to a method of making and using fiber reinforced plastic composing members with interior pultruted shapes for use with concrete supports such as those used in piles and columns. This invention was funded in part under Contract No. B-9135 with the Florida Department of Transportation.

BACKGROUND AND PRIOR ART

Deterioration of the nation's infrastructure has been well known in the last several years. Existing columns used for bridges formed from steel and/or concrete have numerous problems. The steel structural columns are prone to losing their structural integrity over time by corrosion due to wet weather conditions and the like. Corrosion is especially a problem for steel structural supports used in coastal areas.

Concrete bridge pier type columns are also subject to deterioration of their long-term durability and their structural durability. Permeability of the exposed concrete by water can cause the concrete to deteriorate over time. For example, in northern climate areas that are subject to the changing weather conditions due to winter and summer, moisture trapped in concrete during the winter which freezes can expand and crack the concrete piers. Furthermore, corrosion is known to occur to the reinforcing steel bars used inside concrete columns.

Known techniques such as epoxy coating and/or galvanizing the steel reinforcing bars has not been successful over long periods of time especially in severe weather environments such as the Florida Keys.

Both concrete and steel columns can additionally fail in known seismic zone areas such as Southern California. Furthermore, hurricane prone areas such as Florida can also decrease the durability of the concrete and steel.

Thus, the need exists for solutions to the above referred problems.

SUMMARY OF THE INVENTION

The first objective of the present invention is to provide a method of waterproofing and insulating the exposed concrete columns and piles of infrastructure supports.

The second objective of this invention is to provide a method for protecting reinforcing bars if they are used in concrete infrastructure support piles and columns from the effects of corrosion.

The third objective of this invention is to provide a method for increasing the ductility of concrete support columns and piles.

The fourth objective of this invention is to provide a method for improving lifespan of concrete support piles and columns without the use of additional steel reinforcing bars and cages.

The fifth objective of this invention is to provide a method for enhancing the compressive, flexural and shear strengths of concrete support columns and piles.

The sixth objective of this invention is to provide a concrete structural support column and pile for use in hurricane and seismic zone locations.

The invention consists of several embodiments of a fiber reinforced plastic (FRP) composite member for increasing the compressive, flexural and shear strengths of concrete columns and supports comprising. The basic structure includes an exterior shell component and interior pultruted shape with a concrete core. The exterior shell is a generally cylindrical shell consisting of a multilayer filament winding or alternatively a fiber and a resin compound. The interior pultruted member consists of fibers located longitudinally within the exterior shell. A cylindrical cement core is located within the shell and about the interior pultruted member, where the interior pultruted member and the exterior shell provide axial and circumferential reinforcement for the concrete core. The fiber and the resin used in both the exterior shell and the interior pultruted member can include approximately 60–63% percent glass and approximately 37–40% polyester. Alternatively, the fiber is chosen from at least one of glass, carbon, and Kevlar. The fiber is combined with a resin chosen from at least one of polyester, vinylester, and epoxy. The exterior shell can include a multilayer tube of various forms. The multilayer tube can have an inner ply of longitudinal axial fibers and an outer ply of circumferential hoop fibers. The multilayer tube can alternatively have a multilayer angle ply with plus or minus $\alpha°$ winding angle. Alternatively, the multilayer can have a layer of axial longitudinal fibers sandwiched between the inner and outer layers of circumferential hoop fibers.

The exterior shell has several embodiments that included a circular cross-sectional shape, a rectangular cross-sectional shape, a square cross-sectional shape, or an elliptical cross-sectional shape.

The interior pultruted member has several embodiments that can include hollow pultrusions with inward indented cross-sectional shape and the ribs attached to inner sides of the exterior shell. Another embodiment of the interior protruding member includes hollow pultrusion in ribbed cross-sectional shape with the ribs attached to and extending outward from outer sides of the exterior shell or another embodiment of the interior pultruted member includes intersecting angled rib beams having a star-crossed cross-sectional shape. Still another embodiment of the interior pultruted member includes an inner cylinder having a circular cross-sectional shape, the inner cylinder inside and coaxial to the exterior shell. A still another embodiment of the interior pultruted member includes standard structural shapes such as, but not limited to, I or H. The concrete core can include materials chosen from at least one of plain concrete, fiber reinforced concrete, high strength concrete, steel reinforced concrete, fiber reinforced and plastic reinforced concrete.

Further objectives and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The invention consists of hollow FRP shell filled with concrete. The core can be further reinforced with pultruted FRP shapes.

Specimens of concrete filled FRP tubes were made at the University of Central Florida on Dec. 9, 1995. Approximately 28 specimens(including 7 control specimens without the tubes) were built. The size of the specimens were approximately 6 inches in diameter with a 12 inch height. The small size of the specimens was done due to the limitations of testing capabilities. During testing on Jan. 6, 1995, the strength of the specimens exceeded the testing equipment and the compression machine failed. The specimens were subsequently tested at the Rinker Materials Laboratory at West Palm Beach on Feb. 14, 1995. Results of the latter tests indicate that an ⅛ inch fiberglass tube can more than triple the concrete strength as compared to not using a fiberglass tube.

Figure 1A:
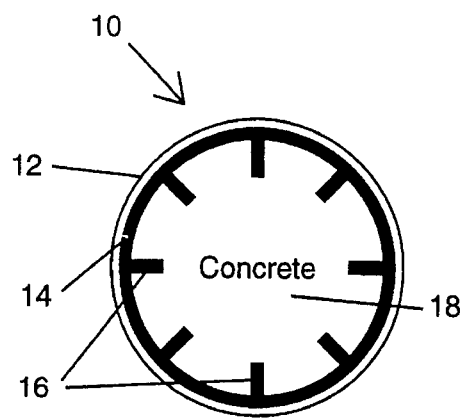
FIG. 1A is a cross-sectional view of a first preferred embodiment FRP casing with attached pultruted shape around a concrete member.

FIG. 1A is a cross-sectional view of a first preferred embodiment 10. Invention 10 consists of an exterior filament wound shell 12, interior pultruted fiber reinforced plastic (FRP) portions 14, 16, and concrete core 18. Exterior filament shell 12 provides for several benefits including: (a) form for concrete core 18, (b) protection as a sealer or membrane against environmental effects such as corrosion, (c) axial reinforcement for the member 10 (d) confinement for the member 10, and (e) shear reinforcement for the member 10 itself. The exterior filament shell 12 is more clearly described in reference to FIGS. 3A and 3B. Referring to FIG. 1A, interior pultruted FRP portions 14 and 16 consists of combinations of fiber and resin. Types of fiber used in the invention can include but are not limited to glass, carbon, Kevlar and the like. Types of resin used in the invention can include but are not limited to polyester, vinylester, epoxy, and the like. The fiber and resin combinations can be manufactured by processes such as but not limited to hand lay-up, filament winding, pultrusion and the like.

Hand lay-up is a method of producing fiber reinforced plastic components. The fibers can be pre-impregnated with resin (i.e., they are wetted by resin). Rolling can be done to consolidate the fibers in the resin.

The filament winding process consists of continuously wrapping impregnated fibers (wetted with resin) around a mandrel. Once the desired thickness is achieved, the process stops. After curing, the mandrel is removed from inside the hardened tube.

The pultrusion is an automated fabrication process by which a mixture of fibers and resin is pulled through a die which has an opening similar to the desired cross-section of the final product. The pultruted member is then cut and cured.

In FIG. 1A, interior pultruted portion 14 can have a circular cross-sectional area with interior formed rib portions 16 attached to one another. The ribs could be part of the main pultruted shape, or could be attached to the FRP shape afterwards.

Concrete core 18 can be a normal strength concrete, normal-weight or light weight concrete, fiber reinforced concrete(FRC) or high strength concrete. A 28-day compressive strength of concrete cylinders indicate the strength of concrete. Normal strength concrete is often regarded as concrete up to 6000 psi. Fiber reinforced concrete is a mixture of regular concrete (i.e., cement, aggregate and water) and fibers (chopped fibers made of steel or plastic materials).

Figure 1B:
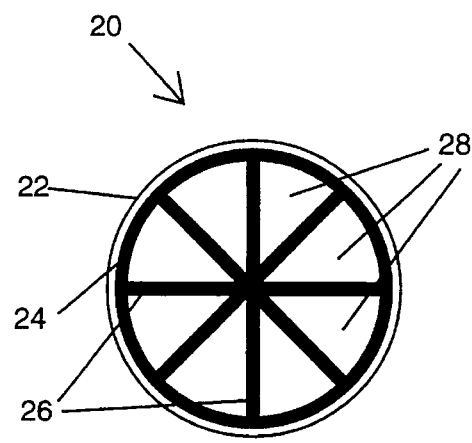
FIG. 1B is a cross-sectional view of a second preferred embodiment FRP casing with attached pultruted shape around a concrete member.

FIG. 1B is a cross-sectional view of a second preferred embodiment 20. Here, components 22, 24, 26 and 28 correspond to respective like components 12, 14, 16, and 18. In FIG. 1B, interior pultruted FRP portion 24 can have a circular cross-sectional area with interior formed rib FRP portions 16 in an angled crossed pattern all of which are attached to one another.

Figure 1C:
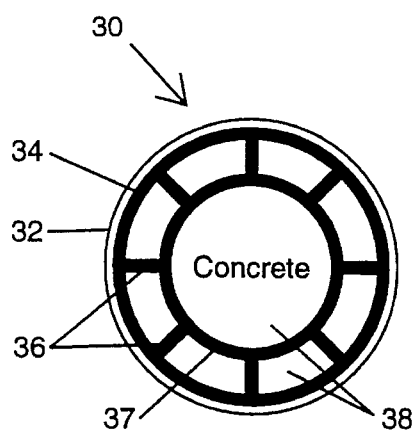
FIG. 1C is a cross-sectional view of a third preferred embodiment FRP casing with attached pultruted shape around a concrete member.

FIG. 1C is a cross-sectional view of a third preferred embodiment 30. Here, components 32, 34, 36 and 38 correspond to respective like components of FIGS. 1A and 1B. Additional interior protruding FRP member 37 has a circular cross-sectional shape which is coaxial to outer cylindrical FRP shape 34.

Figure 1D:
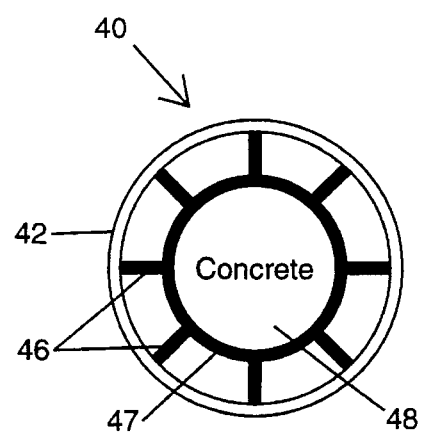
FIG. 1D is a cross-sectional view of a fourth preferred embodiment FRP casing with attached pultruted shape around a concrete member.

FIG. 1D is a cross-sectional view of a fourth preferred embodiment 40 consisting of components 42, 46, 47 and 48 which correspond to like components 32, 36, 37 and 38 of FIG. 1C. FIG. 1D, has rib FRP portion attached directly to outer shell 42.

Figure 2A:
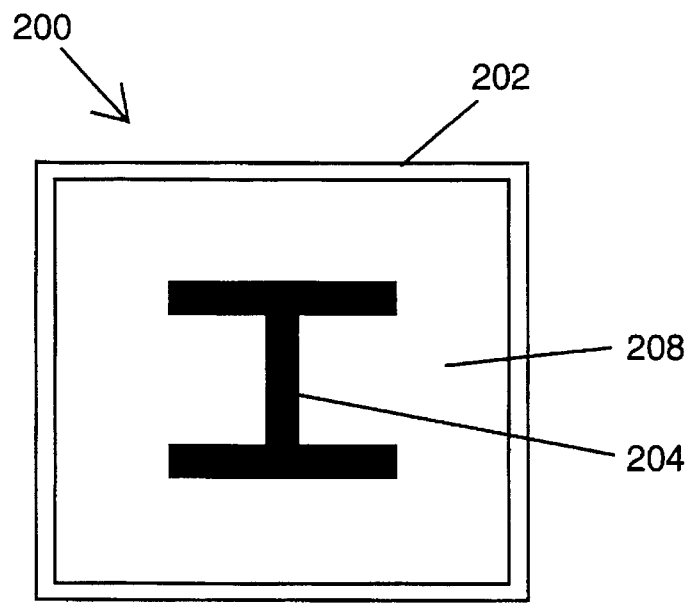
FIG. 2A is a cross-sectional view of a fifth preferred embodiment FRP casing with unattached pultruted shape around a concrete member.

FIG. 2A is a cross-sectional view of a fifth preferred embodiment 200. Here, outer shell 202 similar to those of the previous embodiments is formed with a square cross-sectional shape. Interior pultruted FRP members 204 is connected to a structural shape such as I or H. Member 204 is not attached to outer shell 202. Instead concrete core 208 fills in the space between pultruted members 204 and shell 202.

Figure 2B:
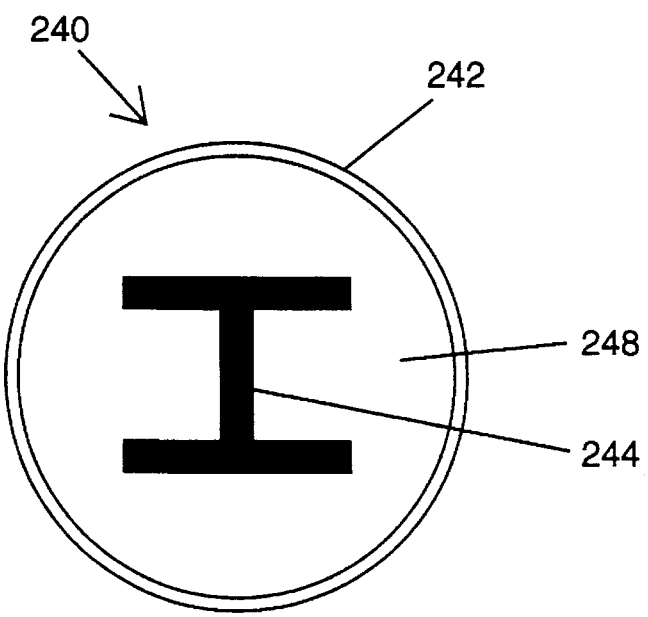
FIG. 2B is a cross-sectional view of a sixth preferred embodiment FRP casing with unattached pultruted shape around a concrete member.

FIG. 2B is a cross-sectional view of a sixth preferred embodiment 240. Components 242, 244 and 248 are similar to like respective components of FIG. 2A. Outer shell 242 has a circular cross-sectional shape.

Figure 3A:
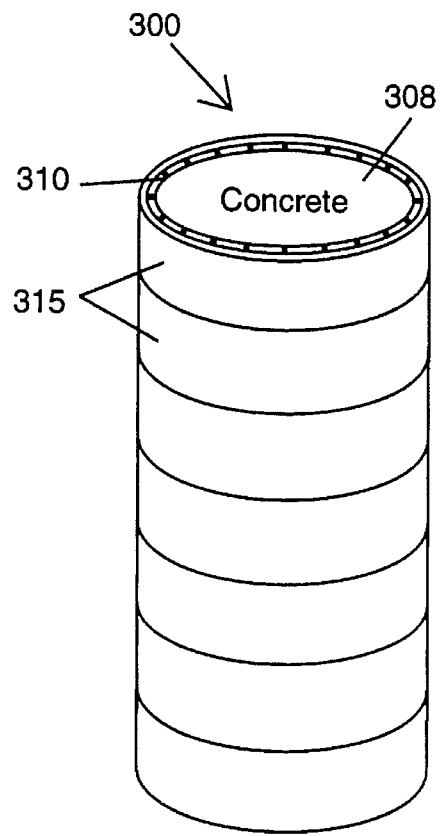
FIG. 3A is a perspective longitudinal view of a seventh preferred embodiment FRP casing with straight/normal/hoop windings and axial fibers, around a concrete member.

FIG. 3A is a perspective longitudinal view of a seventh preferred embodiment 300 and can include a multilayer tube of various forms. The multilayer tube can have an inner ply of longitudinal (axial) fibers 310 and an outer ply of circumferential hoop fibers 315 both formed from the fiber materials previously described. Alternatively, the multilayer can have a layer of longitudinal (axial) fibers 310 sandwiched between inner layer of circumferential hoop fibers (not shown) and outer layer 315 of circumferential hoop fibers. This sandwich design can prevent buckling of axial fibers 310.

Figure 3B:
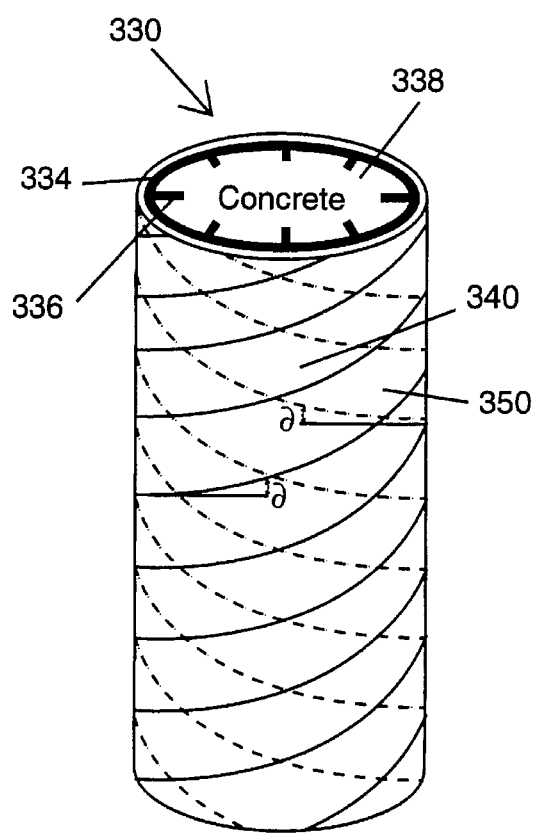
FIG. 3B is a perspective longitudinal view of the first preferred embodiment FRP casing with angle-ply cover with attached pultruted shape around a concrete member.

FIG. 3B is a perspective longitudinal view of another variation multilayer tube exterior shell having with angle-ply cover 340, 350 about concrete core 338. Interior FRP pultruted shapes 334 and 336 correspond to like respective components 14, 16 of FIG. 1A. The shell includes at least two layers 340 and 350 having an angle of plus or minus $\alpha°$ winding to one another.

Figure 4A:
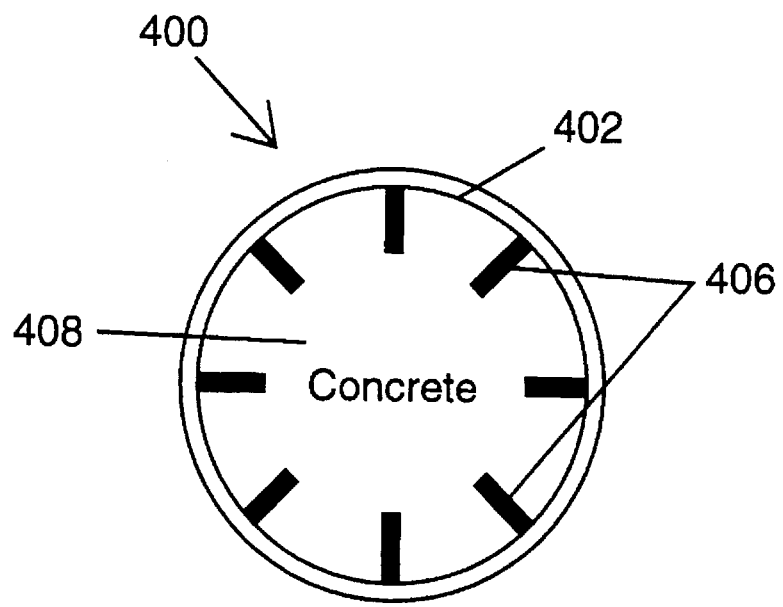
FIG. 4A is a cross-sectional view of a seventh preferred embodiment showing the filament wound shell with pultruted ribs entering toward the center.

FIG. 4A is a cross-sectional view of a seventh preferred embodiment 400 showing a filament wound shell 402 such as one of the ones described in reference to the preceding figures having a circular cross-sectional shape. The shell 402 can be attached to interior pultruted longitudinal FRP ribs 406 which are both about a concrete core 408.

Figure 4B:
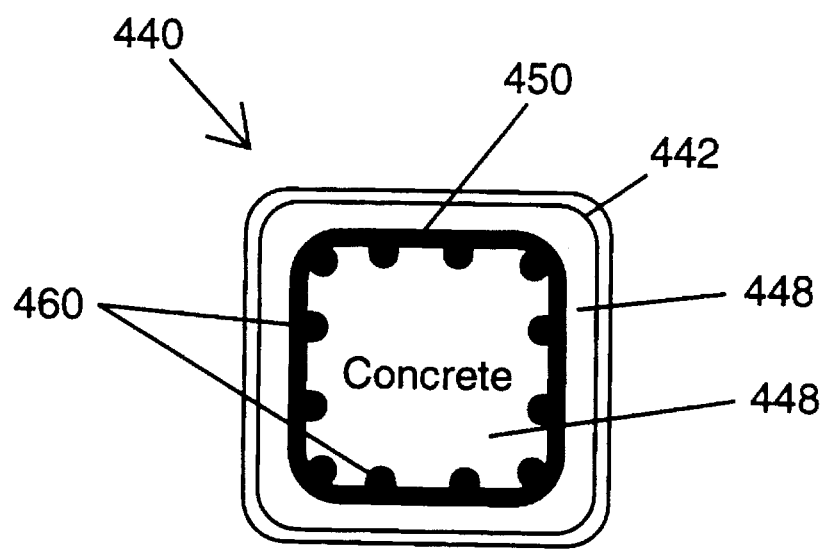
FIG. 4B is a cross-sectional view of an eighth preferred embodiment with reinforcing cage member in optional square shape.

FIG. 4B is a cross-sectional view of an eighth preferred embodiment 440 having exterior shell 442 in a square cross-sectional shape with concrete core 448 located therein. Inside shell 442 can be a steel or FRP reinforcing cage structure 450 with longitudinal steel or FRP bars or rods 460.

The exterior shells depicted in the preceding figures can provide bi-directional external reinforcement of the interior located concrete core, which includes a hoop reinforcement as well as axial reinforcement. The hoop reinforcement confines the concrete core and prevents buckling of any longitudinal fibers and bars located therein and further increases the bond strength of any reinforcing bars that can be used. The longitudinal axial fibers can improve the flexural capacity of the column and pile similar to a concrete-filled steel tube. However, the shell jacket of the subject invention further enhances the interior concrete column/piles shear strength more effectively than steel hoops and steel spirals.

Although the exterior shells are describes as multilayer fiber wound material, the exterior shells can be formed from FRP materials such as fiber and resin that was previously described.

The invention can be used as cast-in-place or as a precast structural member. For precast members, the casting of concrete can be performed by centrifuge techniques in order to enhance the bond between the shell and the core. Cast-in-place means construction of column or pile is done at the construction site, whereas in precast member, construction is done in factory and the member is shipped to the site. In a centrifuge process, concrete is pumped from within the tube in a horizontal position while the tube is rotating, and thus concrete binds itself to the outer tube much better than regular casting.

The invention can be used as precast columns for high-rise buildings and parking garages. Likewise, the invention can be used as concrete piles and caissons. Furthermore, the invention can be used as precast or cast-in-place pier columns for bridges. The invention can have further use as a connection between columns and foundations, or alternatively as a connection between columns and beams.

Typical sizes for piles and columns using the invention can include but are not limited to a 2 or 3 foot outer diameter with an outside height of approximately 10 to 20 feet.

Although the invention describes using fiber and resin combinations to form the exterior and interior FRP portions, these portions can also be formed from hybrid combinations. One such hybrid combination can include but is not limited to forming interior pultruted members solely from carbon and forming exterior shell material solely from glass.

Although the invention describes various shaped FRP components, the FRP shape can be of variable shapes and sizes that each can include variable thicknesses, or constant thickness components, whereby adhering to the basic concepts described herein.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A fiber reinforced plastic (FRP) composite member for increasing the compressive, flexural and shear strengths of concrete columns and supports comprised of:

an exterior shell of a fiber and a resin combination, the combination including approximately 60 to approximately 63% glass and approximately 37 to approximately 40% polyester;

an interior pultruted member of the fiber and the resin combination located longitudinally within the exterior shell; and a concrete core within the shell and about the interior pultruted member, wherein the interior pultruted member and the exterior shell provide axial and circumferential reinforcement for the cement core.

2. The fiber reinforced plastic (FRP) composite member of claim 1, wherein the glass is in combination with at least one of:

carbon and Kevlar; and wherein the polyester is in combination with at least one of:

vinylester and epoxy.

3. The fiber reinforced plastic (FRP) composite member of claim 1, wherein the exterior shell includes:

a multilayer tube.

4. The fiber reinforced plastic (FRP) composite member of claim 3, wherein the multilayer tube further includes:

an inner ply of longitudinal axial fibers; and an outer ply of circumferential hoop fibers.

5. The fiber reinforced plastic (FRP) composite member of claim 3, wherein the multilayer tube further includes:

a multilayer angle ply with plus or minus $\alpha°$ winding angle.

6. The fiber reinforced plastic (FRP) composite member of claim 3, wherein the multilayer tube further includes:

a layer of axial longitudinal fibers sandwiched between inner and outer layers of circumferential hoop fibers.

7. The fiber reinforced plastic (FRP) composite member of claim 1, wherein the exterior shell includes:

a circular cross-sectional shape.

8. The fiber reinforced plastic (FRP) composite member of claim 1, wherein the exterior shell includes:

a rectangular cross-sectional shape.

9. The fiber reinforced plastic (FRP) composite member of claim 1, wherein the exterior shell includes:

a square cross-sectional shape.

10. The fiber reinforced plastic (FRP) composite member of claim 1, wherein the exterior shell includes:

an elliptical cross-sectional shape.

11. The fiber reinforced plastic (FRP) composite member of claim 1, wherein the interior pultruted member includes:

pultruted shapes with pultruted ribs attached to inner sides of the exterior shell.

12. The fiber reinforced plastic (FRP) composite member of claim 1, wherein the interior pultruted member includes:

a pultruted shape with pultruted ribs attached to and extending outward from outer sides of the exterior shell.

13. The fiber reinforced plastic (FRP) composite member of claim 1, wherein the interior pultruted member includes:

pultruted shapes with a star-crossed cross-sectional shape.

14. The fiber reinforced plastic (FRP) composite member of claim 1, wherein the interior pultruted member includes:

an inner cylinder having a circular cross-sectional shape, the inner cylinder inside and coaxial to the exterior shell.

15. The fiber reinforced plastic (FRP) composite member of claim 1, wherein the interior pultruted member includes:

a FRP structure having an I cross-sectional shape.

16. The fiber reinforced plastic (FRP) composite member of claim 1, wherein the interior pultruted member includes:

a FRP structure having an H cross-sectional shape.

17. A fiber reinforced plastic (FRP) composite member for increasing the compressive, flexural and shear strengths of concrete columns and supports comprising:

an exterior multilayer shell of a fiber and a resin combination, wherein the fiber includes at least one of: glass, carbon and kevlar, and the resin includes at least one of polyester, vinylester, and epoxy;

an interior pultruted member of the fiber and the resin combination located longitudinally within the exterior shell; and a concrete core within the shell and about the interior pultruted member, wherein the interior pultruted member and the exterior shell provide axial and circumferential reinforcement for the concrete core used as a support column and pillar.

18. The fiber reinforced plastic (FRP) composite member of claim 17, wherein the combination further includes:

approximately 60 to approximately 63% fiber; and approximately 37 to approximately 40% resin.

19. A fiber reinforced plastic (FRP) composite member for increasing the compressive, flexural and shear strengths of concrete type columns and supports comprising:

an exterior shell formed solely from glass;

interior pultruted members located within the exterior shell, the interior pultruted members formed solely from carbon; and a concrete core within the exterior shell and about the interior pultruted members, wherein the interior pultruted members and the exterior shell provide axial and circumferential reinforcement for the concrete core used as a support column and pillar.

* * * * *